US008156519B1

(12) United States Patent
Kleinmann

(10) Patent No.: US 8,156,519 B1
(45) Date of Patent: Apr. 10, 2012

(54) SYSTEM, METHOD AND COMPUTER PROGRAM PRODUCT FOR CALCULATING THE COST OF AN ADVERTISEMENT

(75) Inventor: Amit Kleinmann, Tel-Aviv (IL)

(73) Assignee: Amdoes Software Systems Limited, Dublin (IE)

( * ) Notice: Subject to any disclaimer, the term of this patent is extended or adjusted under 35 U.S.C. 154(b) by 768 days.

(21) Appl. No.: 11/206,711

(22) Filed: Aug. 17, 2005

Related U.S. Application Data

(60) Provisional application No. 60/704,308, filed on Aug. 1, 2005.

(51) Int. Cl.
*H04N 7/10* (2006.01)
(52) U.S. Cl. ......................................................... 725/32
(58) Field of Classification Search ................. 725/9, 22, 725/32
See application file for complete search history.

(56) References Cited

U.S. PATENT DOCUMENTS

| | | | |
|---|---|---|---|
| 6,216,129 B1 * | 4/2001 | Eldering | 705/36 R |
| 6,487,538 B1 | 11/2002 | Gupta et al. | 705/14 |
| 6,820,277 B1 * | 11/2004 | Eldering et al. | 725/35 |
| 2002/0133397 A1 * | 9/2002 | Wilkins | 705/14 |
| 2003/0126611 A1 * | 7/2003 | Chernock et al. | 725/105 |
| 2004/0181543 A1 * | 9/2004 | Wu et al. | 707/102 |
| 2004/0243470 A1 * | 12/2004 | Ozer et al. | 705/14 |
| 2006/0206912 A1 * | 9/2006 | Klarfeld et al. | 725/40 |

OTHER PUBLICATIONS

American Psychological Association (APA): filter. (n.d.). Collins English Dictionary—Complete & Unabridged 10th Edition. Retrieved Apr. 13, 2011, from Dictionary.com website: http://dictionary.reference.com/browse/filter.*
http://replay.waybackmachine.org/20041024115531/http://dictionary.reference.com/search?q=filter.*
What Next for TV Advertising? Market Overview, by Eric Schmitt, Forrester Research, Inc., Dec. 23, 2004.
How to turn digital ad insertion challenges into opportunities, by Joseph Ambeault, Director of Advertising Systems, SeaChange International, CED magazine Oct. 2001. http://www.cedmagazine.com/ced/2001/1001.10g,htm.
http://www.dotomi.com, 2005.

* cited by examiner

*Primary Examiner* — Joseph P Hirl
*Assistant Examiner* — An Nguyen
(74) *Attorney, Agent, or Firm* — Zilka-Kotab, PC

(57) ABSTRACT

A system, method and computer program product are provided for calculating the cost of an advertisement. Initially, data reflecting an advertisement and usage of the advertisement may be provided. The data provided may then be rated. A cost may then be calculated based on the rated data.

11 Claims, 5 Drawing Sheets

SYSTEM, METHOD AND COMPUTER PROGRAM PRODUCT FOR CALCULATING THE COST OF AN ADVERTISEMENT

This application claims the benefit of U.S. Provisional Application No. 60/704,308 filed on Aug. 1, 2005, the disclosure of which is incorporated herein by reference.

FIELD AND BACKGROUND OF THE INVENTION

The present invention relates to software, and more particularly, to business management software.

Marketers/advertisers have difficulties in reaching their target audiences. In today's multi-channel environment, it's becoming increasingly difficult for advertisers to target audiences. An appropriate accounting mechanism is needed that can ensure a proper compensation for reaching the target audience. Marketers have difficulties in reaching large blocks of unduplicated eyeballs. They are willing to pay top dollar for that (an issue that is called the reach premium).

Conventional data that advertisers seek to collect for making future advertising decisions include receivers' liking of the advertisement, preference for the advertisement and intent to purchase based on the advertisement. However, to date, such conventional data has only been measured by direct responses to advertising methods, such as coupons, toll-free phone numbers, and/or copy testing with sample receivers. As a consequence, the collection methods of such conventional data have merely provided gross indicators of an advertisement's audience and financial impact.

Traditionally, the cost for an advertiser to run an advertisement (e.g. commercial, etc.) has been based on an estimated number of people who are predicted to watch the content that is broadcasted around the advertisement itself, such as a television show, etc. In the case of a commercial on television, the estimated cost is adjusted after the commercial is presented, according to information collected from a sample of viewers/receivers that only measure the percentage of the sample viewers/receivers whose television/set-top box was tuned on the proper channel when the specific commercial was broadcasted and presented. On the web, the estimated cost is adjusted according to the number of viewers who clicked on the advertisement. In addition, the cost has also been associated with a type of demographic group of the predicted number of receivers. The advertisement cost is also associated with the type of content around it. To this end, the cost is not based on usage and/or effectiveness of the actual advertisement, and less attention is paid to the advertisement.

Recent changes in the ways in which receivers watch content, and especially television, have affected the accuracy of the traditional cost calculation method. For example, with innovations such as digital cable television which includes a wide variety of channels, many receivers are no longer watching advertisements between television shows, but are rather simply switching the channel during the commercial break.

In addition, with the large number of television channels from which to choose, the number of receivers for particular channels has declined in general. This widespread disbursement has resulted in narrow demographics associated with each channel which, in turn, has made it difficult for advertisers to successfully target broad demographics.

Furthermore, accurately determining a demographic group generally associated with a specific channel by taking a sample of receivers associated with the specific channel is difficult. This is mainly due to the fact that many receivers do not only watch specific channels, but instead disburse their viewing throughout many channels. Thus, one may find only a few households (if any) that watch specific channels, and this is not a big enough sample to make the appropriate statistical calculations for those channels and the associated content, advertisement, etc. Hence, the cost of advertisement in these channels can not be feasibly calculated using traditional sampling methods.

Another inherent problem with traditional advertisement pricing methods is that, since information is typically provided manually, they are incapable of allowing even near real-time calculation. Also, information that is capable of being collected automatically still must be processed by a third party (e.g. Nielsen, etc.), thus delaying the distribution of the information. As a consequence, the pricing of advertisements are also incapable of being calculated in real-time or near real time.

These problems result in advertisers inefficiently spending money on advertising. For these reasons, there is a need for a usage-sensitive method of determining costs to advertisers for running advertisements. There is thus a need for overcoming these and/or other problems associated with the prior art.

SUMMARY

A system, method and computer program product are provided for calculating the cost of an advertisement. Initially, data reflecting an advertisement and usage of the advertisement may be provided. Such data may be provided by utilizing an input device. The data provided may then be rated, utilizing a processor in communication with the input device. A cost may optionally be calculated based on the rated data. Such calculation may be performed by also utilizing the processor. Further, the calculated cost may be output by utilizing an output device in communication with the processor.

DETAILED DESCRIPTION

Figure 1:
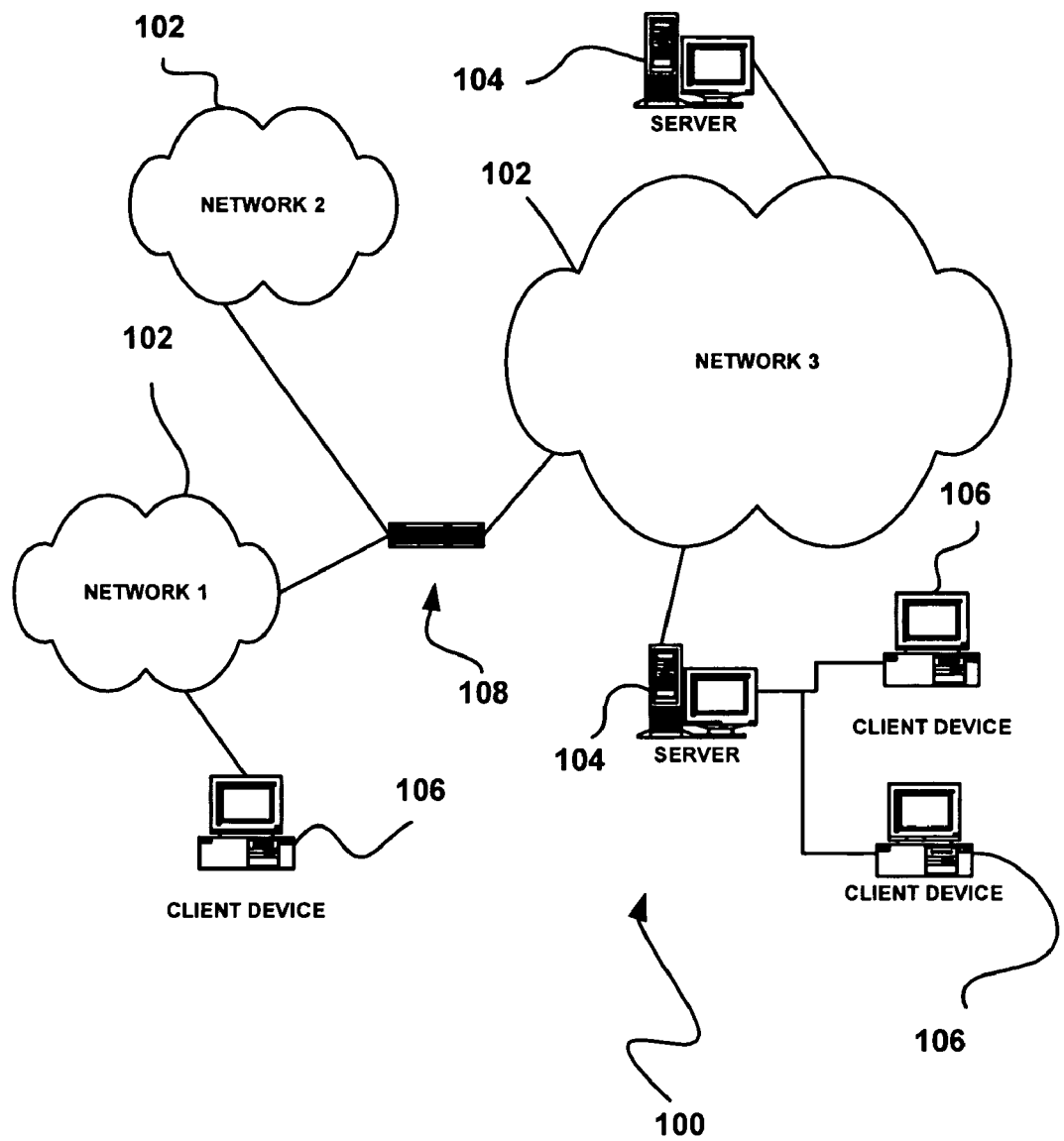
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), Metropolitan Area Network (MAN), wireless network, wide area network (WAN) such as the Internet, etc.

Coupled to the networks 102 are server devices 104 which are capable of communicating over the networks 102. Such server devices 104 may each include, network switch, Cable Modem Termination System (CMTS), server computer and/or any other type of logic. Also coupled to the networks 102 and the server devices 104 is a plurality of client devices 106. Such client devices 106 may each include a desktop computer, lap-top computer, hand-held computer, television (digital and/or analog), television set-top box (digital and/or analog), personal video recorder (PVR), mobile phone, hand-held computer, radio (satellite and/or terrestrial), and/or any other type of logic. In order to facilitate communication among the networks 102, at least one gateway or router 108 is optionally coupled therebetween.

Figure 2:
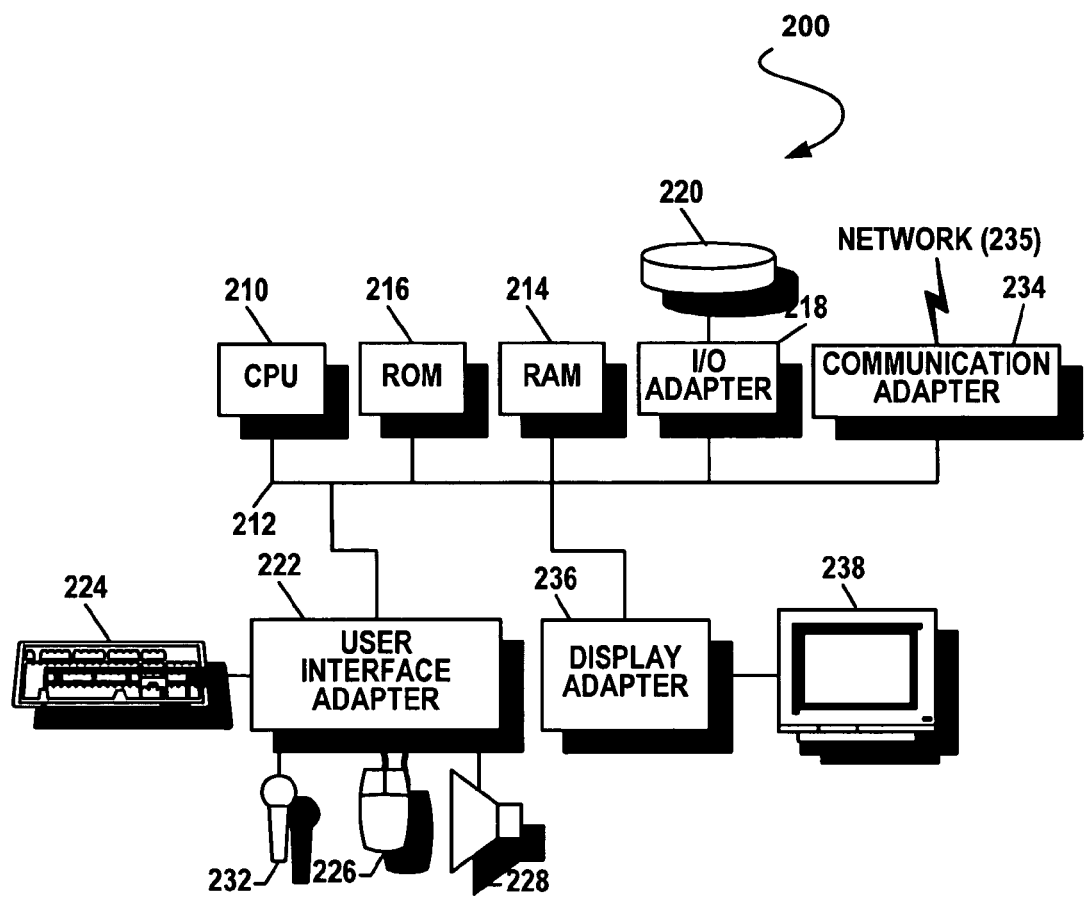
FIG. 2 shows a representative hardware environment that may be associated with the server devices and/or client devices of FIG. 1, in accordance with one embodiment.

FIG. 2 shows a representative hardware environment that may be associated with the server devices 104 and/or client devices 106 of FIG. 1, in accordance with one embodiment. Such figure illustrates a possible hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
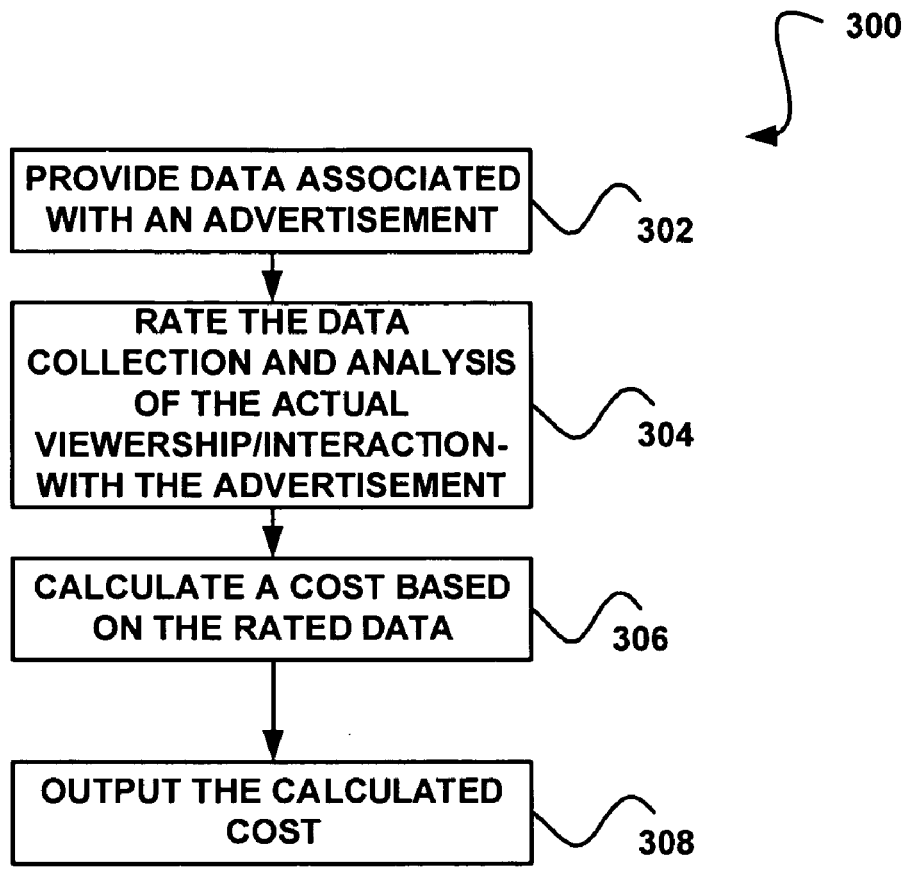
FIG. 3 shows a method for calculating the cost of an advertisement, in accordance with one embodiment.

FIG. 3 shows a method 300 for calculating the cost of an advertisement, in accordance with one embodiment. As an option, the method 300 may be implemented in the context of the architecture and environment of FIGS. 1 and/or 2. Of course, however, the method 300 may be carried out in any desired environment.

Initially, data is provided, as shown in operation 302. The data includes a-priori meta-data and/or any data that is related to an advertisement. In the context of the present description, the advertisement may include a web-based advertisement (e.g. advertisement placed on a website, etc.), a television-based advertisement (e.g. commercials between television shows, advertisements within television shows, advertisements on cable television, advertisements on digital television, etc.), and/or any other advertisement capable of having data associated with it.

As an option, the data may include data associated with the advertisement itself. Such advertising data may include, but is not limited to, the availability of the advertisement (e.g. displayed as part of a television show, displayed between segments of a television show, displayed after actively searched by receiver, etc.) and/or the time length of the advertisement. Further included may be the type of presentation of the advertisement (e.g. portion of display advertisement utilizes, form of media such as text, graphical, audio, multimedia, etc.), and/or the position of the advertisement on the display.

Still yet, the advertising data may also include any interactivity associated with the advertisement, such as whether the advertisement allows for input collection, e-Commerce, etc. In addition, the data may include the type of content (e.g. television show, website, etc.) to which the data is attached and/or an estimated number of people who are expected to watch the content to which the data is attached.

Even still, the foregoing data may further identify, characterize, etc. the advertiser(s) associated with the advisement. To this end, different advertisers may receive different rates, etc., in a manner that will soon become apparent.

Of course, the foregoing examples of data are set forth for illustrative purposes only and should not be construed as limiting in any manner. For example, in the context of the present description, any data related to an advertisement may be provided. Further examples of such data will be set forth hereinafter in greater detail, particularly during reference to operation 304 whereby additional real-time data is collected.

As an option, a plurality of parameters may specify the various data that is provided. For instance, the parameters may specify any combination of the above mentioned variations of data. Of course, any data related to an advertisement may be specified in combination with any other such data, in order for a desired cost of the advertisement to be calculated.

In addition, the data that is provided in operation 302 may be provided manually and/or automatically utilizing an input device (e.g. see, for example, various input devices in FIGS. 1 and 2, etc.). For example, such input device may include a keyboard associated with a computer, a telephone, a network interface, and/or any other input device capable of allowing data to be provided. Further, the data may, in one optional embodiment, be provided into a database, or any other device (e.g. see, for example, various devices in FIGS. 1 and 2, etc.) capable of receiving the data, maintaining the data and/or providing the data upon request.

After the data is provided in operation 302, the data is then rated, as depicted in operation 304. For example, the data may be rated according to any method capable of assigning a price value to each of the parameters (e.g. which specify each type of data provided in operation 302). For example, the data may be rated according to rules configured by a user. The rules may be set or may be flexible based on predefined conditions. The rules may also provide for rate discounts based on predefined conditions. Optionally, the rating may be particular to each advertiser, such that different advertisers may receive different rates for each piece of data collected.

Within operation 304, a rate is first determined for each of the parameters related to the advertisement in operation 302, and then the determined rate is assigned to the associated parameter of the advertisement. Further, as an option, actual usage data may also be rated. Additionally, such usage data may be rated in real-time. As an option, the data may be rated utilizing any system capable of rating data. Just by way of example, the data may be rated utilizing the Amdocs® Charging™ Platform. Of course, any other system for rating data associated with advertisements may be utilized in the context of operation 304. See Table 1 for an example of determined rates assigned to associated parameters related to the advertisement.

TABLE 1

| RECORD | ADVERTISEMENT | PARAMETERS | PARAMETER RATING RULES |
|---|---|---|---|
| Record1 | Advertisement1 | Content surrounding the advertisement | If content during primetime, then content_rate = $A/second, else content_rate = $B/second. |

TABLE 1-continued

| RECORD | ADVERTISEMENT | PARAMETERS | PARAMETER RATING RULES |
|---|---|---|---|
| | | Media form of advertisement | If media is television, then media_rate = $C/second, if media is website, then media_rate = $D/second, else media_rate = $E/second. |

The data may optionally be rated utilizing a processor (e.g. see, for example, various processors in FIGS. 1 and 2). Such a processor may include a computer and/or a portion thereof that is capable of storing and/or implementing logic for rating the data in operation 304, or any other device capable of storing and/or implementing logic for rating the data in operation 304. In addition, the processor may optionally be in communication with the input devices described with respect to operations 302 and 304

Further in operation 304 (after the data is provided in operation 302 and possibly in parallel with the foregoing rating), the collection and analysis of the actual viewership/interaction-with the advertisement is completed.

For example, in one embodiment, the data may include receiver data relating to a receiver (i.e. a user who views and/or listens to the advertisement, etc.), such as a profile identifier of the person receiving (or interacting with) the advertisement (that can be matched with a specific demographic profile), the number of times the receiver has received the advertisement and/or any data associated with the receiver of the advertisement that is capable of being provided. To this end, both static and dynamic information may be provided.

Furthermore, the data may include data associated with actual receipt of the advertisement. For example, actual receipt data may include actual initiation degree, e.g., was the advertisement pushed and presented to the receiver or how much efforts the receiver invested in order to find and/or initiate/present the advertisement, an actual length of time the advertisement was received and/or any actual interaction between the receiver and the advertisement (e.g. whether the receiver was passive, whether the receiver input information in association with the advertisement, a type of purchase associated with the advertisement, a degree of navigation throughout the advertisement performed by the receiver, etc.).

Still yet, the data may include a number of receivers with a specified demographic group that received the content surrounding the advertisement. See Table 2 for an example of usage data that is aggregated, summarized and analyzed for calculating the cost of an advertisement.

TABLE 2

| RECORD | ADVERTISEMENT | PARAMETERS |
|---|---|---|
| Record1 | Advertisement1 | Profile identification of receiver; Actual degree of navigation with the advertisement |
| Record2 | Advertisement1, Advertisement2 | Time length advertisement was displayed |
| Record3 | Advertisement1, Advertisement3 | Degree of input related to the advertisement that is entered by the receiver during or after the advertisement; Type of purchase made by receiver related to eCommerce associated |

TABLE 2-continued

| RECORD | ADVERTISEMENT | PARAMETERS |
|---|---|---|
| Record4 | Advertisement3 | with advertisement Time length the advertisement was displayed |

Various options associated with the monitoring in operation 304 will be described in further detail with respect to FIG. 4. Usage of the advertisement may be optionally monitored utilizing at least one processor. Of course, such processor may be the processor described with respect to operation 304, but, of course, may be any processor capable of carrying out the logic required to monitor usage data, as described with respect to operation 304.

After the data is rated in operation 304, a cost is calculated based on the rated data, as shown in operation 306. The cost may be a total cost to the advertiser for presenting the advertisement and may further be calculated with respect to the rates assigned to each of the parameters of the advertisement, as previously described with respect to operation 304. In one embodiment, the cost may be calculated, for example, according to a sum of all of the rates assigned to each of the parameters with respect to an associated advertisement, according to a predefined value added or multiplied to one or more of the parameters with respect to an associated advertisement, and/or according to any other method capable of calculating a cost to an advertiser based on rated data.

Optionally, the cost may be calculated by utilizing at least one processor. Such processor may be the processor described with respect to operation 304, but, of course, may be any processor capable of carrying out the logic required to calculate the rated data from operation 304, as described with respect to operation 306.

Still yet, the calculated cost may be outputted, as depicted in operation 308. The calculated cost may be output to a database, a report, an invoice, a user, an advertiser, and/or any other person and/or device capable of receiving an outputted cost. Operation 308 may be accomplished utilizing an output device (e.g. see, for example, various output devices in FIGS. 1 and 2, etc.). The output device may include a computer and/or a component thereof, a telephone capable of presenting the price, or any other device and/or a component thereof capable of outputting the calculated cost of operation 306. Additionally, the output device may be in communication with the processor(s) utilized in operations 304 and 306.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
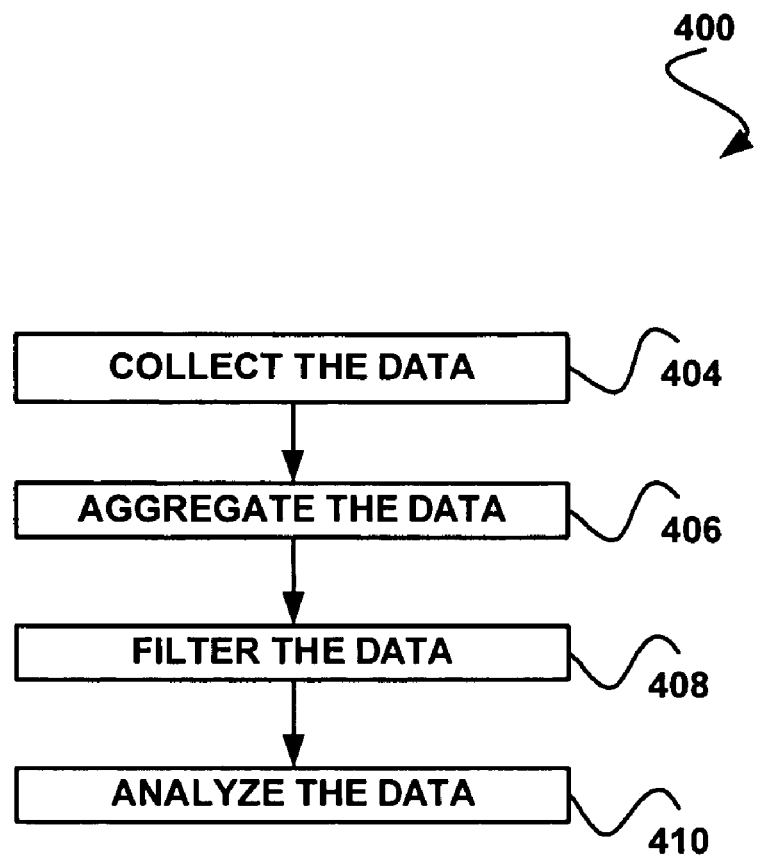
FIG. 4 shows a method of monitoring usage of an advertisement for updating a calculated cost of the advertisement, in accordance with another embodiment.

FIG. 4 shows a method 400 of monitoring usage of an advertisement for updating a calculated cost of the advertisement, in accordance with another embodiment. As an option, the method 400 may be implemented in the context of the architecture and environment of FIGS. 1-3 (with the same definitions applying herein). Specifically, method 400 may be implemented in the context of operation 304 of FIG. 3. Of course, however, the method 400 may be carried out in any desired environment.

Any third party system may be utilized in combination with the present embodiment for providing the data in the manner of method 400. Just by way of example, the Amdocs® Service Mediation Manager™ 6 may be utilized for such purpose, which includes various modules for operations 404-410.

Collecting the data, as shown in operation 404, may involve any mechanism for collecting data. For instance, the data may be collected from a database of events associated with the advertisement. Furthermore, the database may be populated with events that have been monitored by a data collector. Such monitored events may include events associated with any type of data related to the advertisement. Data may also be collected from any customer relationship management (CRM) product having a database of demographic information of receivers. It is important to note that the data may be collected in real-time.

In addition, the data may be aggregated, as in operation 406, according to an associated advertisement, a type of the data, and/or any other method desired to aggregate the data. Such aggregation may utilize any type of database or other device capable of maintaining aggregated data.

Furthermore, the aggregated data of operation 406 may then be filtered, as shown in operation 408. For example, the aggregated data may be filtered according to the plurality of parameters related to the advertisement, such as, for example, the parameters provided in operations 302 and 304 of FIG. 3. Specifically, only the data associated with defined parameters may be maintained.

As an option, the aggregated data may be filtered for duplicated data. In particular, if multiple data collectors are utilized, e.g., a primary data collector and a backup data collector (for achieving high availability of the collection/aggregation system), in the collection of data in operation 404, such data may be cross-correlated from the different data collectors. This cross-correlation allows for duplicated data to be filtered out before the data is provided for calculating a cost of the advertisement. Again, the filtering of operation 408 may also be performed in real-time.

The filtered data of operation 408 may also be analyzed, as shown in operation 410, before being provided to a cost calculating method, such as that in operation 306 of FIG. 3. Analyzing the data may include associating the data with a specific advertisement. In addition, the data may be analyzed for a specific instance of receiver interaction, and/or a specific instance of a receiver purchase via an e-Commerce framework. Such analyzing may allow for only one instance of such events to be associated with an advertisement. Of course, the data may be analyzed in any way in order to effectively provide data for determining a cost of an advertisement.

Again, the collecting, aggregating, filtering and analyzing of the data allows for only pertinent data to be provided when calculating a cost of an advertisement, such as, for example, the cost calculated with respect to FIG. 3. This ultimately allows for an efficient manner of calculating a cost of an advertisement, while still allowing for real-time calculations.

Figure 5:
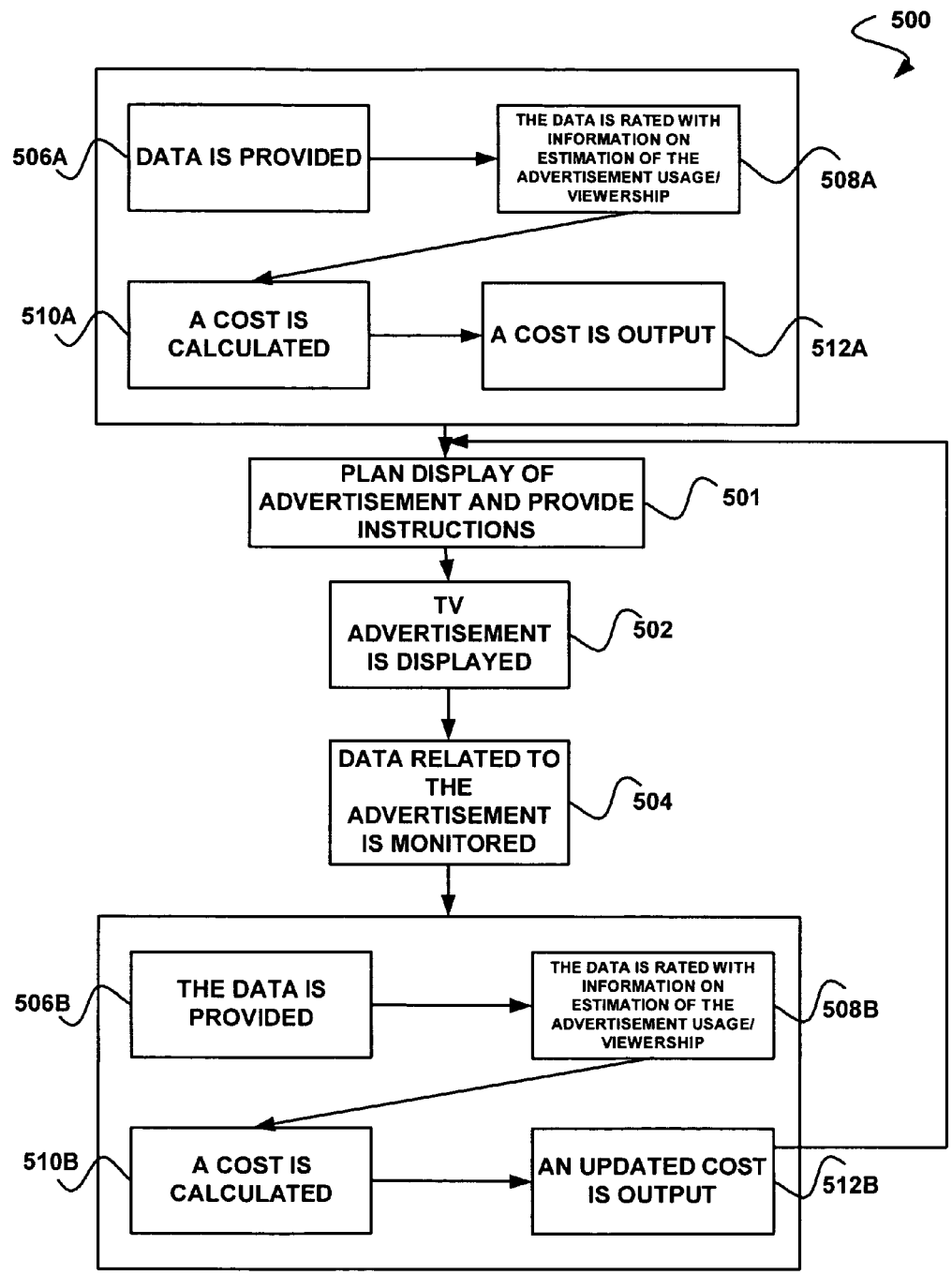
FIG. 5 shows a process for calculating the cost of a television advertisement, in accordance with yet another embodiment.

FIG. 5 shows a process 500 for calculating the cost of a television advertisement, in accordance with yet another embodiment. As an option, the process 500 may be implemented in the context of the architecture and environment of FIGS. 1-4 (with the same definitions applying herein). Of course, however, the process 500 may be carried out in any desired environment.

Initially, data is provided, as shown in operation 506A. Such data may include any data associated with an advertisement. Specifically, the data may include the data as described with respect to operation 302 of FIG. 3. The data provided in operation 506A together with information on estimation of the advertisement usage/viewership (that is calculated e.g., according to historical data) may then be rated, as in operation 508A. Of course the data may be rated in any desired way, including but not limited to the manner described with respect to operation 304 of FIG. 3.

Next, a cost is calculated, as shown in operation 510A. The cost may be calculated in any manner associated with the rated data of operation 508A, but of course may be calculated in the manner described with respect to operation 306 of FIG. 3. The cost calculated in operation 510A is then output, as shown in operation 512A.

A plan is then created with respect to a display of the advertisement and instructions are provided for executing such a plan, as shown in operation 501. The plan may include any information associated with the advertisement. See Table 3 for examples of information that may be incorporated into the plan and associated instructions of operation 501.

TABLE 3

Type of advertisement to display (e.g. television, web, etc.)
Receiver or receiver group to which the advertisement is to be sent
Time slot to display advertisement
Channel to display advertisement
Content to surround advertisement
Time length to display advertisement
Number of times to display advertisement Furthermore, the plan and associated instructions of operation 501 may be created according to requirements of the advertiser associated with the advertisement. As an option, such requirements may be stored in a database, or stored in any manner capable of associating them with an advertiser. The requirements of the advertiser may include any of the information described in Table 3, but of course may include any other information associated with an advertisement. The plan and associated instructions of operation 501 may also be created according to available time slots available for presenting the advertisement.

Still yet, the plan and associated instructions of operation 501 may be created according to a budget of the advertiser. For example, a cumulated cost of all displayed advertisements for each advertiser may be provided and may be compared to a designated threshold (i.e. budget) of the associated advertiser. The plan and associated instructions of operation 501 may then be created according to whether the threshold has been met and/or according to an amount available until the threshold is met. In this way, only advertisements within the budget of an advertiser are displayed.

In operation 502, according to one embodiment, an advertisement is presented based on the plan and instructions of operation 501. The advertisement may be presented on cable television, local television, digital television, and/or on any other type of media capable of presenting an advertisement. Furthermore, the advertisement may be displayed via a media capable of providing user interaction with the advertisement.

While the advertisement is being presented in operation 502, data associated with the advertisement is monitored, as shown in operation 504. Such data may include any data associated with the presentation of the advertisement, any data associated with a receiver of the advertisement, any data associated with the advertisement itself, and/or any other data capable of being provided with respect to an advertisement and/or usage thereof. Of course, such data may also include any of the data described with respect to operation 304 of FIG. 3.

After (and/or even during) the monitoring of the advertisement of operation 504 (in any manner, including, for example, the method described with respect to operations 404-410 on FIG. 4), the data is provided, similar to operation 506A. Thus, as an option, only a portion of the data that is monitored may be provided during the current operation 506B. The data (e.g. advertisement a-priori meta-data together with the data that has been monitored) is then rated, as depicted in operation 508B. In this way, providing the data and rating the data are capable of being accomplished in real-time.

In operation 508B, the data is rated according to predefined rules. Such rating includes assigning a price to each type of data provided earlier. After rates are assigned to all of the data provided, a cost is then calculated based on the rates, as shown in operation 510B. Such cost calculation may be based on the rates in any manner capable of creating a desired price for the presentation of the advertisement. Again, such cost calculation may be performed in real-time.

Finally, after the cost is calculated in operation 510B, the cost is then output, as shown in operation 512B. The cost may be output to any device and/or person capable of receiving the cost. As an option, the cost may be output to a computer system (e.g. database, report, etc.) and/or an advertiser of the advertisement. Of course any device capable of receiving output may be utilized.

To this end, the output in operation 512B may be fed back to operation 501, such that the instructions thereof may be updated based on such output. Again, alterations may be made to the advertiser's plan, the instructions may be altered in view of a budget threshold being surpassed, etc. A technique is thus provided for providing a more accurate method of calculating a cost of an advertisement, in real-time or near real-time.

Table 4 illustrates various business models that may optionally be implemented in the context of the present description.

TABLE 4 a) The charging solution may allow various charging models.
b) The charging rate or charging model may be modified.
c) It may be possible also to apply special rates based on the time of day.
d) It may be possible to restrict special rates to a specific advertisement or advertisement within specific surrounding content.
e) It may be possible to enforce per-campaign usage limits using online charging on a per advertiser basis (may apply to prepaid and postpaid advertisers).
f) It may be possible for online charging systems to check the amount of advertisement budget used over some time period.
g) The online charging systems can provide usage credit indication/threshold. In case it detects the counted usage reaches the indicated usage credit/threshold, it may send a request for credit to an online charging server (OCS) with the remaining credit.
h) A number of different inputs can be used in the decision to identify the specific charging to apply. For example, an advertisement may be charged with different rates depending on what advertisement policy is applicable.

Following is a glossary of terms that may or may not be applicable to the present description.

GLOSSARY a) Advertisement Consumption: advertisement viewership and/or interaction with an advertisement and/or transactions (such as financial transaction) that are associated with an advertisement) and are performed during or following an advertisement is presented.
b) Advertisement Accounting: The collection of data regarding advertisement consumption, for the purposes of capacity and trend analysis, cost allocation, auditing, and billing. Accounting management requires that advertisement consumption be measured, rated, assigned, and communicated between appropriate parties.
c) Advertisement Accounting Protocol: A protocol used to convey data for accounting purposes.
d) Real-time Advertisement accounting: Real-time accounting involves the processing of information on advertisement consumption within a defined time window. Time constraints are typically imposed in order to limit financial risk.
e) Advertisement Rating: The act of determining the price to be charged for Advertisement Consumption.
f) Advertisement Billing: The act of preparing an invoice.
g) Usage sensitive billing: A billing process that depends on usage information to prepare an invoice can be said to be usage-sensitive. In contrast, a process that is independent of usage information is said to be non-usage-sensitive.
h) Interim accounting: Interim accounting provides a snapshot of usage during an advertisement consumption. This may be useful in the event of a device reboot or other network problem that prevents the reception or generation of a summary of the advertisement consumption. Interim accounting records can always be summarized without the loss of information. Note that interim accounting records may be stored internally on the device (such as in non-volatile storage) so as to survive a reboot and thus may not always be transmitted over the wire.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

The invention claimed is:

1. A method for calculating the cost of an advertisement, comprising:

receiving, utilizing a processor, first requirements of a first advertiser associated with a first advertisement, the first requirements including a first receiver to which the first advertisement is to be sent, a time length to display the first advertisement, and a content to surround the first advertisement;

receiving second requirements of a second advertiser associated with a second advertisement, the second requirements including a second receiver to which the second advertisement is to be sent, a time length to display the second advertisement, and a content to surround the second advertisement;

receiving a first threshold from the first advertiser;

receiving a second threshold from the second advertiser;

comparing the first threshold from the first advertiser with a cumulated cost of a first plurality of previously displayed advertisements of the first advertiser, and determining that the first threshold received from the first advertiser has not been met by the cumulated cost of the first plurality of previously displayed advertisements of the first advertiser;

comparing the second threshold from the second advertiser with a cumulated cost of a second plurality of previously displayed advertisements of the second advertiser, and determining that the second threshold received from the second advertiser has not been met by the cumulated cost of the second plurality of previously displayed advertisements of the second advertiser;

generating, in response to the determination that the first threshold has not been met, a first plan to display the first advertisement, the first plan generated according to the first requirements of the first advertiser, a time slot to display the first advertisement, and an amount available until the first threshold is met, such that the first plan effects at least one display of the first advertisement until the first threshold is met;

generating, in response to the determination that the second threshold has not been met, a second plan to display the second advertisement, the second plan generated according to the second requirements of the second advertiser, a time slot to display the second advertisement, and an amount available until the second threshold is met, such that the second plan effects at least one display of the second advertisement until the second threshold is met;

providing first instructions for executing the first plan to display the first advertisement;

providing second instructions for executing the second plan to display the second advertisement;

displaying the first advertisement according to the first instructions;

displaying the second advertisement according to the second instructions;

monitoring a usage of the first advertisement by the first receiver while the first advertisement is being displayed, and generating first usage data based on the usage of the first advertisement by the first receiver, the first usage data associated with the first advertisement and including a parameter associated with the display of the first advertisement, a parameter associated with the first receiver of the first advertisement, a parameter reflecting a degree of interactivity of the first advertisement by indicating whether the first advertisement allows for input collection and e-Commerce, and a parameter reflecting a usage of the first advertisement by the first receiver of the first advertisement;

monitoring a usage of the second advertisement by the second receiver while the second advertisement is being displayed, and generating second usage data based on the usage of the second advertisement by the second receiver, the second usage data associated with the second advertisement and including a parameter associated with the display of the second advertisement, a parameter associated with the second receiver of the second advertisement, a parameter reflecting a degree of interactivity of the second advertisement by indicating whether the second advertisement allows for input collection and e-Commerce, and a parameter reflecting a usage of the second advertisement by the second receiver of the second advertisement;

analyzing the first usage data and the second usage data to identify a specific instance of receiver interaction by at least one of the first receiver with the first advertisement and the second receiver with the second advertisement;

rating both the display of the first advertisement and the display of the second advertisement utilizing the first usage data and the second usage data, the rating performed by:

determining a rate for each of the parameters included in the first usage data associated with the first advertisement, the rate for at least one of the parameters included in the first usage data being dependent on the identification of the specific instance of receiver interaction by the first receiver of the first advertisement, assigning to each of the parameters included in the first usage data the rate determined for the parameter, determining a rate for each of the parameters included in the second usage data associated with the second advertisement, the rate for at least one of the parameters included in the second usage data being dependent on the identification of the specific instance of receiver interaction by the second receiver of the second advertisement, and assigning to each of the parameters included in the second data the rate determined for the parameter;

calculating a cost of the first advertisement utilizing the rates assigned to each of the parameters included in the first usage data associated with the first advertisement;

calculating a cost of the second advertisement utilizing the rates assigned to each of the parameters included in the second usage data associated with the second advertisement;

adding the cost of the first advertisement to the cumulated cost of the first plurality of previously displayed advertisements of the first advertiser to generate a first updated cumulated cost, comparing the first updated cumulated cost to the first threshold received from the first advertiser and determining that the first threshold has been at least one of met and surpassed by the first cumulated cost;

altering the first instructions to display the first advertisement in response to the determination that the first threshold of the first advertiser has been at least one of met and surpassed by the first cumulated cost, the alteration of the first instructions stopping display of the first advertisement;

adding the cost of the second advertisement to the cumulated cost of the second plurality of previously displayed advertisements of the second advertiser to generate a second cumulated cost, comparing the second cumulated cost to the second threshold received from the second advertiser and determining that the second threshold has not been met or surpassed by the second cumulated cost;

identifying an updated amount available until the second threshold is met by comparing the second cumulated cost to the second threshold received from the second advertiser; and generating, in response to the determination that the second threshold has not been met or surpassed, a third plan to display the second advertisement, the third plan generated according to the second requirements of the second advertiser, the time slot to display the second advertisement, and the updated amount available until the second threshold is met, such that the third plan effects at least one display of the second advertisement until the second threshold is met.

2. The method as recited in claim 1, wherein the first usage data includes first a-priori meta-data reflecting the first advertisement, and the second usage data includes second a-priori meta-data reflecting the second advertisement.

3. The method as recited in claim 1, wherein the parameter reflecting the degree of interactivity of the first advertisement involves input collected from the first receiver.

4. The method as recited in claim 1, wherein the first usage data reflects a profile of the first receiver including static information and dynamic information.

5. The method as recited in claim 1, wherein the first advertisement includes a television advertisement.

6. The method as recited in claim 1, wherein the first advertisement includes a web-based advertisement.

7. The method as recited in claim 1, wherein the rating of both the display of the first advertisement and the display of the second advertisement provides for rate discounts based on predefined conditions.

8. A computer program product embodied on a non-transitory computer readable medium, comprising:
  computer code for receiving first requirements of a first advertiser associated with a first advertisement, the first requirements including a first receiver to which the first advertisement is to be sent, a time length to display the first advertisement, and a content to surround the first advertisement;
  computer code for receiving second requirements of a second advertiser associated with a second advertisement, the second requirements including a second receiver to which the second advertisement is to be sent, a time length to display the second advertisement, and a content to surround the second advertisement;
  computer code for receiving a first threshold from the first advertiser;
  computer code for receiving a second threshold from the second advertiser;
  computer code for comparing the first threshold from the first advertiser with a cumulated cost of a first plurality of previously displayed advertisements of the first advertiser, and determining that the first threshold received from the first advertiser has not been met by the cumulated cost of the first plurality of previously displayed advertisements of the first advertiser;
  computer code for comparing the second threshold from the second advertiser with a cumulated cost of a second plurality of previously displayed advertisements of the second advertiser, and determining that the second threshold received from the second advertiser has not been met by the cumulated cost of the second plurality of previously displayed advertisements of the second advertiser;
  computer code for generating, in response to the determination that the first threshold has not been met, a first plan to display the first advertisement, the first plan generated according to the first requirements of the first advertiser, a time slot to display the first advertisement, and an amount available until the first threshold is met, such that the first plan effects at least one display of the first advertisement until the first threshold is met;
  computer code for generating, in response to the determination that the second threshold has not been met, a second plan to display the second advertisement, the second plan generated according to the second requirements of the second advertiser, a time slot to display the second advertisement, and an amount available until the second threshold is met, such that the second plan effects at least one display of the second advertisement until the second threshold is met;
  computer code for providing first instructions for executing the first plan to display the first advertisement;
  computer code for providing second instructions for executing the second plan to display the second advertisement;
  computer code for displaying the first advertisement according to the first instructions;
  computer code for displaying the second advertisement according to the second instructions;
  computer code for monitoring a usage of the first advertisement by the first receiver while the first advertisement is being displayed, and generating first usage data based on the usage of the first advertisement by the first receiver, the first usage data associated with the first advertisement and including a parameter associated with the display of the first advertisement, a parameter associated with the first receiver of the first advertisement, a parameter reflecting a degree of interactivity of the first advertisement by indicating whether the first advertisement allows for input collection and e-Commerce, and a parameter reflecting a usage of the first advertisement by the first receiver of the first advertisement;
  computer code for monitoring a usage of the second advertisement by the second receiver while the second advertisement is being displayed, and generating second usage data based on the usage of the second advertisement by the second receiver, the second usage data associated with the second advertisement and including a parameter associated with the display of the second advertisement, a parameter associated with the second receiver of the second advertisement, a parameter reflecting a degree of interactivity of the second advertisement by indicating whether the second advertisement allows for input collection and e-Commerce, and a parameter reflecting a usage of the second advertisement by the second receiver of the second advertisement;
  computer code for analyzing the first usage data and the second usage data to identify a specific instance of receiver interaction by at least one of the first receiver with the first advertisement and the second receiver with the second advertisement;
  computer code for rating both the display of the first advertisement and the display of the second advertisement utilizing the first usage data and the second usage data, the rating performed by:
    determining a rate for each of the parameters included in the first usage data associated with the first advertisement, the rate for at least one of the parameters included in the first usage data being dependent on the identification of the specific instance of receiver interaction by the first receiver of the first advertisement,
    assigning to each of the parameters included in the first usage data the rate determined for the parameter,
    determining a rate for each of the parameters included in the second usage data associated with the second advertisement, the rate for at least one of the parameters included in the second usage data being dependent on the identification of the specific instance of receiver interaction by the second receiver of the second advertisement, and
    assigning to each of the parameters included in the second data the rate determined for the parameter;
  computer code for calculating a cost of the first advertisement utilizing the rates assigned to each of the parameters included in the first usage data associated with the first advertisement;
  computer code for calculating a cost of the second advertisement utilizing the rates assigned to each of the parameters included in the second usage data associated with the second advertisement;
  computer code for adding the cost of the first advertisement to the cumulated cost of the first plurality of previously displayed advertisements of the first advertiser to generate a first updated cumulated cost, comparing the first updated cumulated cost to the first threshold received from the first advertiser and determining that the first threshold has been at least one of met and surpassed by the first cumulated cost;

computer code for altering the first instructions to display the first advertisement in response to the determination that the first threshold of the first advertiser has been at least one of met and surpassed by the first cumulated cost, the alteration of the first instructions stopping display of the first advertisement;

computer code for adding the cost of the second advertisement to the cumulated cost of the second plurality of previously displayed advertisements of the second advertiser to generate a second cumulated cost, comparing the second cumulated cost to the second threshold received from the second advertiser and determining that the second threshold has not been met or surpassed by the second cumulated cost;

computer code for identifying an updated amount available until the second threshold is met by comparing the second cumulated cost to the second threshold received from the second advertiser; and computer code for generating, in response to the determination that the second threshold has not been met or surpassed, a third plan to display the second advertisement, the third plan generated according to the second requirements of the second advertiser, the time slot to display the second advertisement, and the updated amount available until the second threshold is met, such that the third plan effects at least one display of the second advertisement until the second threshold is met.

9. A system, comprising:
a hardware processor for:
  receiving, utilizing a processor, first requirements of a first advertiser associated with a first advertisement, the first requirements including a first receiver to which the first advertisement is to be sent, a time length to display the first advertisement, and a content to surround the first advertisement;
  receiving second requirements of a second advertiser associated with a second advertisement, the second requirements including a second receiver to which the second advertisement is to be sent, a time length to display the second advertisement, and a content to surround the second advertisement;
  receiving a first threshold from the first advertiser;
  receiving a second threshold from the second advertiser;
  comparing the first threshold from the first advertiser with a cumulated cost of a first plurality of previously displayed advertisements of the first advertiser, and determining that the first threshold received from the first advertiser has not been met by the cumulated cost of the first plurality of previously displayed advertisements of the first advertiser;
  comparing the second threshold from the second advertiser with a cumulated cost of a second plurality of previously displayed advertisements of the second advertiser, and determining that the second threshold received from the second advertiser has not been met by the cumulated cost of the second plurality of previously displayed advertisements of the second advertiser;
  generating, in response to the determination that the first threshold has not been met, a first plan to display the first advertisement, the first plan generated according to the first requirements of the first advertiser, a time slot to display the first advertisement, and an amount available until the first threshold is met, such that the first plan effects at least one display of the first advertisement until the first threshold is met;
  generating, in response to the determination that the second threshold has not been met, a second plan to display the second advertisement, the second plan generating according to the second requirements of the second advertiser, a time slot to display the second advertisement, and an amount available until the second threshold is met, such that the second plan effects at least one display of the second advertisement until the second threshold is met;
  providing first instructions for executing the first plan to display the first advertisement;
  providing second instructions for executing the second plan to display the second advertisement;
  displaying the first advertisement according to the first instructions;
  displaying the second advertisement according to the second instructions;
  monitoring a usage of the first advertisement by the first receiver while the first advertisement is being displayed, and generating first usage data based on the usage of the first advertisement by the first receiver, the first usage data associated with the first advertisement and including a parameter associated with the display of the first advertisement, a parameter associated with the first receiver of the first advertisement, a parameter reflecting a degree of interactivity of the first advertisement by indicating whether the first advertisement allows for input collection and e-Commerce, and a parameter reflecting a usage of the first advertisement by the first receiver of the first advertisement;
  monitoring a usage of the second advertisement by the second receiver while the second advertisement is being displayed, and generating second usage data based on the usage of the second advertisement by the second receiver, the second usage data associated with the second advertisement and including a parameter associated with the display of the second advertisement, a parameter associated with the second receiver of the second advertisement, a parameter reflecting a degree of interactivity of the second advertisement by indicating whether the second advertisement allows for input collection and e-Commerce, and a parameter reflecting a usage of the second advertisement by the second receiver of the second advertisement;
  analyzing the first usage data and the second usage data to identify a specific instance of receiver interaction by at least one of the first receiver with the first advertisement and the second receiver with the second advertisement;
  rating both the display of the first advertisement and the display of the second advertisement utilizing the first usage data and the second usage data, the rating performed by:
    determining a rate for each of the parameters included in the first usage data associated with the first advertisement, the rate for at least one of the parameters included in the first usage data being dependent on the identification of the specific instance of receiver interaction by the first receiver of the first advertisement,
    assigning to each of the parameters included in the first usage data the rate determined for the parameter, determining a rate for each of the parameters included in the second usage data associated with the second advertisement, the rate for at least one of the parameters included in the second usage data being dependent on the identification of the specific instance of receiver interaction by the second receiver of the second advertisement, and assigning to each of the parameters included in the second data the rate determined for the parameter;

calculating a cost of the first advertisement utilizing the rates assigned to each of the parameters included in the first usage data associated with the first advertisement;

calculating a cost of the second advertisement utilizing the rates assigned to each of the parameters included in the second usage data associated with the second advertisement;

adding the cost of the first advertisement to the cumulated cost of the first plurality of previously displayed advertisements of the first advertiser to generate a first updated cumulated cost, comparing the first updated cumulated cost to the first threshold received from the first advertiser and determining that the first threshold has been at least one of met and surpassed by the first cumulated cost;

altering the first instructions to display the first advertisement in response to the determination that the first threshold of the first advertiser has been at least one of met and surpassed by the first cumulated cost, the alteration of the first instructions stopping display of the first advertisement;

adding the cost of the second advertisement to the cumulated cost of the second plurality of previously displayed advertisements of the second advertiser to generate a second cumulated cost, comparing the second cumulated cost to the second threshold received from the second advertiser and determining that the second threshold has not been met or surpassed by the second cumulated cost;

identifying an updated amount available until the second threshold is met by comparing the second cumulated cost to the second threshold received from the second advertiser; and generating, in response to the determination that the second threshold has not been met or surpassed, a third plan to display the second advertisement, the third plan generated according to the second requirements of the second advertiser, the time slot to display the second advertisement, and the updated amount available until the second threshold is met, such that the third plan effects at least one display of the second advertisement until the second threshold is met.

10. The method as recited in claim 1, wherein the first usage data is attached to the content surrounding the first advertisement, and the first usage data includes a type of the content surrounding the first advertisement to which the first usage data is attached and an estimated number of people who are expected to watch the content surrounding the first advertisement to which the first usage data is attached.

11. The method as recited in claim 1, wherein the first usage data includes actual receipt data including an actual initiation degree, such that the first usage data indicates whether the first advertisement was pushed and presented to the first receiver.

\* \* \* \* \*

UNITED STATES PATENT AND TRADEMARK OFFICE
CERTIFICATE OF CORRECTION

| | | |
|---|---|---|
| PATENT NO. | : 8,156,519 B1 | Page 1 of 1 |
| APPLICATION NO. | : 11/206711 | |
| DATED | : April 10, 2012 | |
| INVENTOR(S) | : Amit Kleinmann | |

It is certified that error appears in the above-identified patent and that said Letters Patent is hereby corrected as shown below:

On the Title Page:
    Item (73), Assignee; please replace "Amdoes Software Systems Limited" with --Amdocs Software Systems Limited--.

In the claims:
    Claim 9, col. 16, line 6; please replace "generating" with --generated--.

Signed and Sealed this
Twenty-ninth Day of May, 2012

David J. Kappos
*Director of the United States Patent and Trademark Office*